United States Patent Office 3,266,871
Patented August 16, 1966

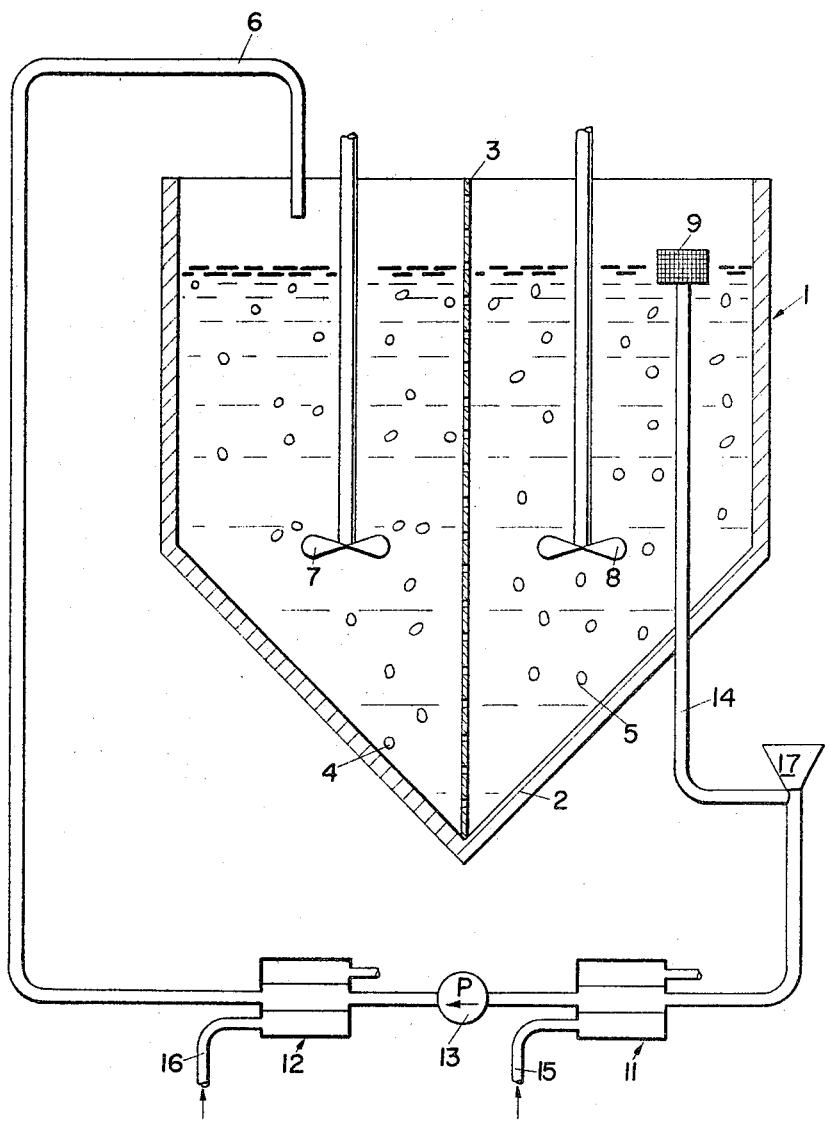

3,266,871
OPTICAL RESOLUTION OF RACEMIC SUBSTANCES
Naomasa Mizoguchi, Musashino, Minoru Hara, Kawasaki, Kenkichi Ito, Kamakura, Takekazu Akashi, Kawasaki, Ko Ohno, Setagaya-ku, Tokyo, and Jiro Kato, Ota-ku, Tokyo, Japan, assignors to Ajinomoto Co., Inc., Tokyo, Japan
Filed Oct. 8, 1963, Ser. No. 314,813
Claims priority, application Japan, May 25, 1960, 35/25,271
4 Claims. (Cl. 23—273)

This is a continuation-in-part of our copending application Serial No. 110,531, filed May 16, 1961, now abandoned.

This invention relates to the optical resolution of racemic substances whose crystals are conglomerates of the crystals of the corresponding optically active enantiomorphs, and more particularly to the resolution of amino acids whose racemate crystals are conglomerates of crystals of the optically active isomers, particularly glutamic acid and its hydrochloride.

It is known that racemates of the type referred to hereinabove are generally capable of being optically resolved by contact between said crystals of one optically active enantiomorph with a supersaturated solution of the racemate. The same enantiomorph is preferentially deposited on the seed crystals, and most of the other undesired enantiomorph is being held in the solution.

In their copending application for United States Letters Patent for a Method of Optically Resolving Racemic Amino Acids, Ito et al. have disclosed that the optical purity of the preferentially deposited enantiomorph critically depends on the control of the compostion of the solution in contact with the seed crystals. They have found that the solution must be replenished at a sufficient rate to maintain the concentration of the undesired enantiomorph in the optically active free form at less than five percent of the combined concentration of this enantiomorph and of the racemate. If this limit is exceeded, the undesired enantiomorph spontaneously crystallizes in such amounts as to seriously contaminate the crystallized product.

We have found a method which permits a supersaturated solution of a racemate to be kept in contact with seed crystals of a selected enantiomorph under such conditions that the critical concentration referred to above is normally not even approached. Our method further is capable of simultaneous separate recovery of both enantiomorphs of the racemate in crystalline form without the need for relatively complex equipment.

Other features and advantages of this invention will become apparent to those skilled in the art as the disclosure is made in the following detailed description of a preferred embodiment of apparatus suitable for performing the method as illustrated in the accompanying sheet of drawing in which:

FIG. 1 shows a processing tank in elevational section, the view being somewhat diagrammatic.

The tank is a container of generally cylindrical upright shape and has a conical bottom 2. It is divided into two equal compartments or vessels by a perforated plate or screen 3. Seed crystals 4 of one optically active enantiomorph are held in one compartment by the screen 3 whose perforations are too small to pass the crystals, and seed crystals 5 of the other enantiomorph of the same substance are retained in the same manner in the other compartment.

The perforations in the plate 3 freely pass a supersaturated racemic solution which is fed to one of the compartments by a feed pipe 6 so that the liquid level in both compartments is the same. The liquid portions in the two compartments are uniformly mixed by two propeller-type agitators 7, 8 which keep the seed crystals 4, 5 in the respective compartments suspended in the turbulent liquid.

The liquid entering the tank 1 overflows from the tank through a screen 9 at the same rate at which it is being fed. The screen 9 is set into the tank wall near the top thereof. The openings in the screen 9 are of a size sufficient freely to pass the solution, but too small to permit escape of the seed crystals.

While the feed pipe 6 has been illustrated to discharge fresh solution into one compartment of the tank, and the screen 9 up to release solution from the other compartment, this arrangement has been selected mainly for the convenience of pictorial representation. The rate of agitation produced by the propellers 7, 8 is sufficient to mix the liquid in the tank 1 homogeneously. While the feed point of fresh solution obviously should not directly coincide with the discharge point of partly spent solution, the locations of the feed pipe 6 and of the screen 9 are not critical.

The manner in which the racemate solution supplied through the pipe 6 is prepared is not in itself relevant to this invention, and may differ according to the nature of the racemate to be resolved or to suit available equipment. There are shown two heat exchangers 11, 12 arranged in series with a pump 13 to constitute a supersaturating unit which receives liquid discharged from the screen 9 through a conduit 14, and delivers supersaturated liquid to the feed pipe 6.

The heat exchanger 11 is connected with a source of heating fluid such as steam through a pipe 15, and the heat exchanger 12 is connected with a source of cooling water through a pipe 16. The flow of heating fluid and cooling water in the heat exchangers is controlled by thermostatic valves in a non-illustrated conventional manner. The heat exchanger 11 is equipped with an inlet 17 which permits solid racemate to be added to the liquid circulated through the supersaturating unit and the tank 1.

The heat exchangers 11, 12, the pump 13, the inlet 17 and the associated connecting conduits may be dispensed with if the solution in the tank 1 is a solution of DL-glutamic acid, and if the concentration of the racemate is maintained by additions of DL-glutamic acid monohydrate, as will hereinafter become apparent.

While the operation of the apparatus shown in FIG. 1 will be described hereinafter with reference to specific compounds, it will be apparent to those skilled in the art that the apparatus is capable of optically resolving all racemic substances whose racemate crystals are conglomerates of crystals of the optically active enantiomorphs. All such racemates are capable of being resolved by selective deposition of one enantiomorph on seed crystals of that enantiomorph, and are thus suitable for resolution in the apparatus of FIG. 1.

The following examples are illustrative of the operation of the apparatus illustrated.

*Example 1*

The tank 1 has a total capacity of 30 liters, 15 liters per compartment. The tank and the supersaturating unit were initially filled with a 25% racemic glutamic acid solution saturated at 55° C. and pH 4.8. The solution was circulated at a flow rate of two liter per minute by the pump 13. One compartment of the tank initially contained 500 grams seed crystals of L-glutamic acid having terminal settling velocities between 0.6 and two meters per minute, and safely confined in their compartments by the 35 mesh apertures in the screen 3. The other compartment of the tank 1 held 500 grams D-glutamic acid in the form of similar crystals. The agitators 7, 8 were run at sufficient speed to keep the optically active glutamic acid crystals uniformly suspended in their respective compartments.

The heat exchanger 11 was set for discharging solution at 65° C., and the heat exchanger 12 for reducing the temperature of the solution to 50°. The temperature of the liquid in the tank 1 was held at 50° C. in a conventional manner not further illustrated. Crystals of racemic glutamic acid were introduced into the inlet 17 at the rate of 500 grams per hour, and were completely dissolved within the heat exchanger 11.

The racemate was split into its optically active constituents at the rate at which it was supplied to the inlet 17, and the seed crystals 4, 5 respectively grew by the deposition of the corresponding optically active isomers from the super-saturated racemate solution at one half of this rate. The grown seed crystals were separately siphoned from the bottom of the tank compartments from time to time at a combined rate of 300 grams per hour, and fresh crystals of the original size were supplied at the rate of 50 grams per hour.

The withdrawn crystals were separated from adhering solution, and washed. After 10 hours, the operation was stopped, and the remaining crystals were withdrawn from each tank compartment. The total crop of L-glutamic acid crystals was 3.9 kilograms, and had an optical purity of 92.3 percent. The D-glutamic acid crystals also weighed 3.9 kilograms, and had an optical purity of 92.5 percent.

*Example 2*

A 25% solution of racemic glutamic acid saturated at 55° C. and pH 4.8 was circulated at a flow rate of one liter per minute through an apparatus of the type illustrated in the drawing. Its tank had a capacity of 12 liters and was divided into two 6-liter compartments by a 36 mesh screen.

Seed crystals of optically active glutamic acid of opposite rotatory power were respectively suspended in the liquid in the two compartments. Each batch of seed crystals weighed 400 grams, and had an optical purity of 98% and a terminal settling velocity between 0.6 and two meters per minute.

Racemic glutamic acid crystals were fed to the circulating liquid through the inlet 17 at a rate of 560 grams per hour. The heat exchanger 12 was set for a discharge temperature of 50° C. and the tank 1 was maintained at the same temperature by a thermostatically controlled system of heating and cooling coils not further illustrated.

After seven hours of operation, the crystals were withdrawn from each compartment separately, centrifuged to remove most of the adhering mother liquor, washed with a small amount of water, and dried. Each batch of withdrawn crystals weighed 2.3 kilograms. The optical purity of the L-glutamic acid crystals was 96.4%, that of the D-glutamic acid crystals 95.6%. The solution overflowing through the screen 9 had no appreciable rotatory power.

*Example 3*

An aqueous solution of 27% DL-glutamic acid content was prepared by saturating water at 70° C. It had a pH of 4.3. The racemate was resolved into the optical enantiomorph in the apparatus described in Example 2 but without the inlet 17. The heat exchanger 12 and the temperature controls of the tank 1 were set for 65° C. Seed crystals were employed as in Example 2.

The liquid in the tank 1 was kept supersaturated with racemic glutamic acid by direct addition of crystals of racemic glutamic acid monohydrate to the tank at a rate of 1200 grams per hour. The specific portion of the tank to which the glutamic acid monohydrate was fed, was not critical since the concentrations of glutamic acid was kept uniform by the strong agitation.

After three hours, the crystals were removed from the tank, separated from adhering mother liquor, washed, and dried. Each batch weighed 2.2 kilograms. The optical purities of the D- and L-glutamic acid crystals was 95.2% and 95.8% respectively. The solution circulated through the heat exchangers 11, 12 by the pump 13 did not show significant optical activity during the period of operation.

The hydrochloride of glutamic acid and certain soluble glutamates such as monoammonium glutamate are representative of other amino acid products capable of being resolved into their optical isomers in the same manner as described above.

It should be understood, of course, that the foregoing disclosure relates to only a preferred embodiment of the invention, and that it is intended to cover all changes and modifications of the examples of the invention herein chosen for the purpose of the disclosure which do not constitute departures from the spirit and scope of the invention set forth in the appended claims.

What is claimed is:

1. An apparaus for optically resolving a racemic substance having two corresponding enantiomorphs into the respective enantiomorphs which comprises:
   (a) a container;
   (b) a screen member in said container and separating the same into two compartments, said screen member being formed with perforations of predetermined size;
   (c) feeding means for continuously feeding a supersaturated solution of said racemic substance to said container;
   (d) overflow means on said container for discharging said solution therefrom;
   (e) a supply of crystal seeds of one of said enantiomorphs in one of said compartments and a supply of crystal seeds of the other enantiomorph in the other compartment, said crystal seeds being of a size sufficient to prevent passage thereof through the perforations of said screen member;
   (f) stirring means in each of said compartments for stirring the solution fed to said container at a rate sufficient to substantially uniformly suspend said crystal seeds in the corresponding compartments and to uniformly mix the two portions of said solution in said compartments; and
   (g) retaining means at said overflow means for retaining said crystal seeds in said container while permitting overflow of said solution.

2. An apparatus as set forth in claim 1, further comprising a source of said supersaturated solution connected to said feeding means.

3. An apparatus for optically resolving a racemic substance having two corresponding enantiomorphs into the respective enantiomorphs which comprises:
   (a) a container;
   (b) a screen member in said container and separating the same into two compartments, said screen member being formed with perforations of predetermined size;
   (c) feeding means for continuously feeding a supersaturated solution of said racemic substance to said container;
   (d) overflow means on said container for discharging said solution therefrom;
   (e) a supply of crystal seeds of one of said two enantiomorphs in one of said compartments and a supply of crystal seeds of the other enantiomorph in the other compartment, said crystal seeds being of a size sufficient to prevent passage thereof through the perforations of said screen member;
   (f) stirring means in each of said compartments for stirring the solution fed to said container at a rate sufficient to substantially uniformly suspend said crystal seeds in the corresponding compartments and to uniformly mix the two portions of said solution in said compartments;
(g) restraining means at said overflow means for retaining said crystal seeds in said container while permitting overflow of said solution; and
(h) a recycling unit connecting said feeding means and said overflow means, said unit including
  (1) heating means for heating the solution discharged from said overflow means,
  (2) cooling means for cooling the heated solution, and
  (3) pump means for actuating sequential flow of said solution from said overflow means through said heating means and said cooling means to said feeding means.

4. An apparatus as set forth in claim 3, further comprising intake means for feeding additional amounts of said racemic substance to the solution in said unit prior to the cooling thereof by said cooling means.

References Cited by the Examiner
UNITED STATES PATENTS

| | | | |
|---|---|---|---|
| 815,272 | 3/1906 | Devereux | 23—267 X |
| 2,128,447 | 8/1938 | Wright | 259—66 X |
| 2,204,180 | 6/1940 | Gerlac | 23—272 |
| 2,546,310 | 3/1951 | Kornei | 23—273 |
| 2,734,804 | 2/1956 | Courthope et al. | 23—272.6 |
| 2,902,520 | 9/1959 | Chuffart | 260—648 |
| 2,940,998 | 1/1960 | Ogawa | 260—534 |
| 2,984,684 | 5/1961 | Fike | 260—534 |
| 2,987,543 | 6/1961 | Purvis | 260—534 |
| 2,990,256 | 6/1961 | Lovine | 23—273 |
| 2,990,258 | 6/1961 | Augustine | 23—273 |

NORMAN YUDKOFF, *Primary Examiner.*
LEON ZITVER, *Examiner.*
G. HINES, A. J. ADAMCIK, D. P. CLARKE,
*Assistant Examiners.*